3,364,412
Patented Jan. 16, 1968

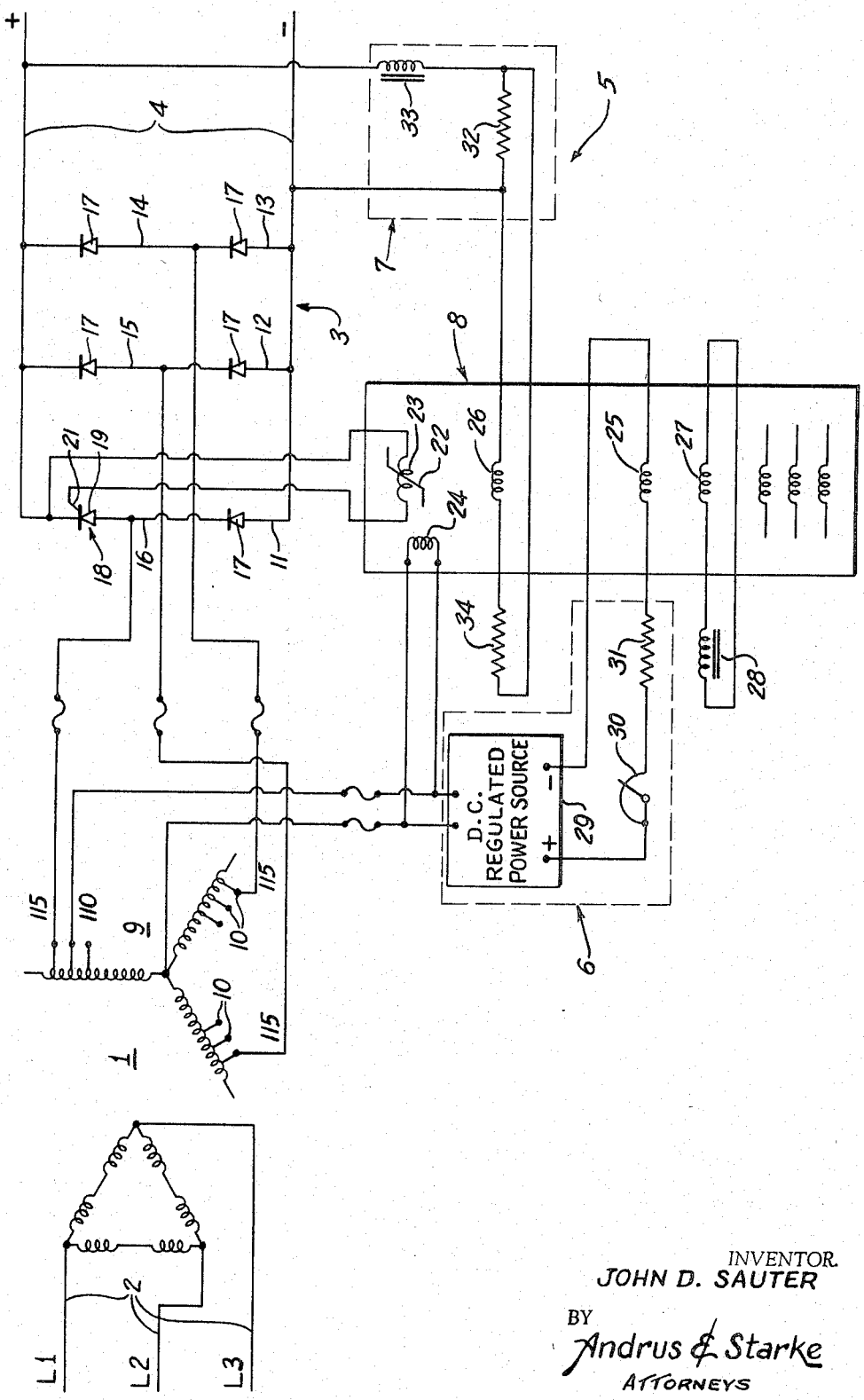

3,364,412
POLYPHASE FULL WAVE RECTIFIER AND CONTROL
John D. Sauter, Lyndhurst, Ohio, assignor, by mesne assignments, to A. O. Smith Corporation, Milwaukee, Wis., a corporation of New York
Filed Nov. 17, 1964, Ser. No. 411,769
11 Claims. (Cl. 321—5)

ABSTRACT OF THE DISCLOSURE

A full wave bridge rectifier is connected to a three phase secondary of a transformer. Each of the legs of the rectifier except one is provided with a diode as the rectifying element. The excepted leg includes a silicon controlled rectifier. A reference control signal and a feedback reference signal are interconnected through a magnetic regulator to the gate of the single silicon controlled rectifier to control the firing thereof.

---

This invention relates to a polyphase full wave rectifier circuit and particularly to a three phase transformer-rectifier combination adapted to provide a regulated output voltage.

Direct current loads in selected applications require energization with a relatively constant direct current derived from an alternating current (A.C.) source such as the usual public power distribution system in the United States. A highly satisfactory unit for converting the alternating current to direct current employs a three phase transformer having a full wave rectifier connected across the secondary circuit of the transformer. To maintain a relatively constant output voltage with variations in line voltage and the like, a regulator is normally interconnected between the input and the output circuit to provide automatic compensation and regulation of the output voltage and thereby hold it substantially constant. Transformers having means to vary the output have been constructed with silicon controlled rectifier elements in each phase path. The output voltage is controlled between zero and 100% by similar firing of the silicon controlled rectifiers. Although such circuits have found substantial application, the silicon controlled rectifiers are relatively expensive components and are subject to failure. Consequently, such systems can only be employed where the initial expense and maintenance costs are justified.

Further, in the usual regulator system, a failure of the regulator will normally cause complete loss of load voltage. This is highly undesirable in many instances.

The present invention is particularly directed to a simplification in a multiphase full wave transformer circuit having a regulator to maintain the voltage relatively constant within a selected line voltage variation and the like and arranged to maintain an unregulated power output of a reduced level if the regulator should fail. In accordance with the present invention, a multiple leg full wave bridge rectifier is connected to the output circuit of the transformer. Each of the legs is provided with a rectifying element and one of the legs employs a silicon controlled rectifier or similar functioning device. A reference control signal and a feedback reference signal are interconnected through a gate switching regulator to control the firing of the single silicon controlled rectifier. It has been found that this system provides very reliable control of a direct current power source and readily compensates for line voltages of the order of plus and minus 5%. Further, in the event the regulator should break down and thereby effectively open the branch of the circuit employing the silicon controlled rectifier, the output voltage will drop somewhat. However, an operative voltage will be maintained in the output circuit thereby also providing a fail safe characteristic.

The drawing furnished herewith illustrates a preferred circuit for carrying out the present invention and clearly illustrates the above features and advantages as well as others which will be clear to those skilled in the art from the following description.

The drawing is a schematic circuit diagram of a three phase, full wave rectifier circuit employing a voltage regulation system constructed in accordance with the present invention.

Referring to the drawing, a three phase transformer 1 is shown connected to a set of three phase incoming power lines 2. A three phase, full wave bridge rectifier unit 3 is connected across the output of the transformer 1 and includes a pair of direct current (D.C.) output lines 4. A regulator 5 includes a signal reference unit 6 connected to the output of the transformer 1 for energization and a signal feedback unit 7 connected to the output lines 4. The signals from units 6 and 7 are applied to a switching and comparator unit 8 which is interconnected to control a single leg or path of the full wave three phase bridge 3, as hereinafter more fully developed. The output voltage at lines 4 proportionately corresponds to the related alternating current output voltage of transformer 1. The D.C. output voltage will therefore tend to vary with variations in the voltage at lines 2 as reflected in the output of the transformer 1. The variation in voltage at lines 4 generates or causes a corresponding feedback signal transmitted by feedback unit 7 to the switching and comparator unit 8. If the voltage rises or falls a selected amount, unit 8 is actuated to change the current conduction period of the associated leg of the bridge circuit 3 to return the output voltage to the desired selected level. In the event the regulator should fail, the corresponding leg of the bridge circuit 3 is held open. The other legs of the bridge circuit 3 however maintain effective operation and produce a correspondinly reduced output voltage. The voltage is suitable for operation of the load until such time as maintenance or repair is made to the regulator or other portion of the circuit causing failure therein.

More particularly in the illustrated embodiment of the invention, the transformer 1 includes a three phase, star connected transformer secondary 9, each leg of which includes a plurality of voltage selection taps 10. The voltage between taps 10 varies in selected steps of approximately 5 volts or the like. In the illustrated circuit the phases are connected to similar taps, 115 volts in this case. The other taps, 110 set and 105 set, may be used when a lower value of output direct current voltage is desired. The taps are for flexibility and there is no theoretical limiting reason as to the number of sets that could be provided.

The full wave three phase bridge 3 includes six rectifying legs 11–16 inclusive with similar individual diodes 17 inserted in the respective legs 11–15 inclusive and a silicon controlled rectifier 18 in leg 16. Each of the diodes may be any suitable rectifying element preferably a small silicon diode.

The silicon controlled rectifier 18 in leg 16 is a well known element and includes an anode 19 and a cathode 20 connected respectively to the A.C. input line from the transformer 1 and the one D.C. line 4. The rectifier 18 normally blocks conduction of current through the corresponding leg of the circuit for both alternate half cycles of the A.C. power supply. The rectifier 18 further includes a trigger or gate 21 which will fire the rectifier 18 into a conducting state if a gate signal is applied to the gate 21 whenever the anode 19 is positive with respect to the cathode 20. The proportion of the corresponding half cycle of the alternating current impressed between output line 4 is controlled by the firing angle of the silicon controlled rectifier 18. This is accomplished in the present invention through the switching and comparator unit 8.

The illustrated comparator unit 8 may be of any suitable variety but is preferably a magnetic system such as shown in the pending patent application of Albert Lewis, entitled Electrical Responsive Control which was filed July 17, 1963 with Ser. No. 295,624 and is assigned to the same assignee as this application or shown in the Bulletin 5100 of The Clark Controller Company of Cleveland, Ohio. The system is diagrammatically shown therein including a core having a relatively rectangular hysteresis characteristic such that it rapidly changes from one state to the other, shown diagrammatically by the usual line symbol 22 through a pulse winding 23 which is wound on the core and connected between the gate 21 and the cathode 20 of the silicone controlled rectifier 18. An alternating current power is supplied to an input primary winding 24 of unit 8 from the same phase winding of secondary winding 9 that supplies the rectifier leg including silicon controlled rectifier 18 and consequently is in phase therewith. Winding 24 is coupled to the winding 23 by core 22 to produce a pulsed output by controlled saturation of core 22.

The precise firing point is selectively controlled by direct current magnetic bias of the core 22 from the input reference unit 6 and the reference feedback unit 7. Unit 6 is connected to energize a reference winding 25 and feedback unit 7 is connected to energize a feedback winding 26 both of which are wound on the core 22 but in opposite directions. A damping winding 27 is also provided on the core 22 and connected in a closed loop circuit with an inductor 28 to provide improved response and operation of the regulator.

The input reference unit 6 includes a regulated direct current source 29 of any suitable construction for example such as the "G.S. Regulator" employing a single phase transformer rectifier unit shown in the previously identified Bulletin 5100 of The Clark Controller Company. Such circuits are well known and the details are therefore not given herein. The unit 6 is connected to the secondary 9 in parallel with the connection to unit 8. The output of the source 29 is connected in series with the reference winding 25 in series with an adjustable rheostat 30 and a current limiting resistor 31. The D.C. energization of the reference winding 25 and therefore the D.C. reference magnetization of core 22 is controlled by the setting of the rheostat 30. This will bias the core 22 in a given direction to set the firing voltage such that the A.C. signal on the winding 24 raises the magnetic characteristic to a level whereby it will rapidly change from one state to another. As a result of the rapid change in the flux state, a pulse signal is generated in the pulse winding 23 and supplied to the gate 19 of silicon controlled rectifier 18 to cause it to fire during the appropriate half cycle.

The firing position is modulated and controlled by the action of the feedback winding 26 which is energized by the feedback unit 7 in accordance with the output voltage at the D.C. output lines 4. The unit 7 includes a reference resistor 32 connected in series with an inductor 33 across the lines 4. The feedback winding 26 is connected across this resistor 32 in series with a resistor 34. A voltage signal proportional to the output voltage appears across the reference resistor 32 and provides energization of the feedback winding 22 in accordance with the D.C. output voltage.

The operation of the circuit is briefly described as follows. The circuit connection to the incoming power lines 2 is completed and the rheostat 30 is set to provide a selected output voltage with a nominal input voltage. If the output voltage is at the desired level, the windings 25 and 26 are properly energized to fire silicon controlled rectifier 18 at an intermediate point in each half cycle that makes the anode 19 positive with respect to cathode 20. If the output voltage at lines 4 rises above the selected level, the increased voltage across the feedback resistor 32 increases the energization of feedback winding 26. This magnetizes the core 22 in a direction which opposes that of the A.C. signal at windings 25 and 24 such that the input half cycle must rise to the greater magnitude to saturate the core 22. As a result, the magnetic changeover point to cause a rapid change in flux through the core 22 occurs at a later time in the half cycle and the silicon controlled rectifier 18 conducts during a smaller portion of the corresponding half cycle of the input voltage. This correspondingly reduces the output voltage and returns it to the selected level.

If the output voltage should decrease from the selected level, a reduced energization of the feedback winding 26 similarly results. Consequently the net D.C. saturation is increased above the normal level and the alternating current input signal causes firing of the silicon controlled rectifier 18 during an early portion of the half cycle. This results in the application of a greater portion of the half cycle between the output lines 4 with a resulting increase in the output voltage and return to the normal level. The output voltage is therefore held at a relatively constant voltage with selected variations in the input.

Although the control is reduced to the order of 95 to 105% of the selected output level, this has been found to be highly satisfactory and applicable to most applications and requirements. Further with the present invention if for any reason the switching and comparator unit 8 or the related equipment should fail such that the regulation is lost, a continued output voltage is maintained to the load. Breakdown would prevent application of a trigger firing pulse signal to the silicon controlled rectifier 18 and it will remain in the normally nonconducting state. As a result, leg 16 of the bridge circuit 3 is effectively removed and the lines 4 and load are supplied from the other two legs. This will normally maintain satisfactory operation of the load for short periods of time during which the system can be maintained and repaired.

The present invention thus provides a simplified reliable safe control system for a multiple phase bridge circuit and provides regulation in an economical and reliable manner.

Various modes of carrying out the invention are contemplated as being within the scope of the following claims particularly pointing out and distinctly claiming the subject matter which is regarded as the invention.

I claim:

1. In a polyphase power source for driving a direct current load at a selected output voltage with a nominal input voltage which tends to vary therefrom,
   a polyhpase transformer having a polyphase secondary,
   a full wave bridge rectifier unit connected to the secondary and having a bridge leg for each phase, all of said legs including rectifiers and with a single one of said rectifiers being a controlled rectifier normally nonconducting in both directions and having a gate means responsive to a signal to establish conduction in one direction through said controlled rectifier, the other rectifiers being normally conducting in one direction and nonconducting in the opposite direction, and
   firing means responsive to the output voltage and connected to said gate means to control the firing of said corresponding rectifier to hold the output voltage at the selected output voltage, whereby if the firing means fails the load power is maintained by the other bridge legs.

2. The polyphase power source of claim 1 wherein the secondary of the transformer is tapped to provide adjustment of the output voltage.

3. The polyphase power source of claim 1 wherein the secondary of the transformer is tapped to provide adjustment of the output voltage and wherein the firing means includes an adjustable reference connected to the secondary to conjointly control the firing of the corresponding rectifier.

4. In a polyphase power source for driving a direct current load at a selected output voltage with a nominal input voltage which tends to vary therefrom,
   a polyphase transformer having a polyphase secondary,
   a full wave bridge rectifier unit connected to the secondary and having a bridge leg for each phase, all of said legs including rectifiers with a single one of said rectifiers being a controlled rectifier normally nonconducting in both directions and having a gate means to establish conduction in one direction through said controlled rectifier, the other rectifiers being normally conducting in one direction and nonconducting in the opposite direction, and
   magnetic gate firing means having feedback winding means responsive to the output voltage and a pulse winding magnetically coupled to the feedback winding means and connected to the gate means of said single one of said rectifiers to control the firing of said corresponding single one of said rectifiers to hold the output voltage at the selected output voltage, whereby if the magnetic gate firing means fails load power is maintained by the other bridge legs.

5. A polyphase regulated static power supply for supplying rectified power from an alternating current source, comprising
   a polyphase transformer unit having a polyphase connected secondary winding,
   a polyphase bridge rectifier having a plurality of rectifying branches connected to the secondary winding to provide full wave rectification of the output, one of said rectifying branches including a controllable rectifier responsive to a firing signal during a selected half cycle of the related phase input and all other branches including rectifiers which are uncontrollable, and
   a switching and comparator unit including an output means to control said controllable rectifier and having a first input and a second input, said first input being connected to the output of said bridge rectifier, and said second input being connected to the secondary winding, the connection to the secondary winding corresponding in phase to the branch of the bridge rectifier including the controllable rectifier.

6. The polyphase static power supply of claim 5 wherein said secondary winding includes a plurality of phase windings each having a plurality of taps, at least one phase being connected to impress a smaller voltage on the bridge rectifier than the other phases.

7. A three phase regulated static power supply for supplying rectified power from an alternating current source, comprising
   a three phase transformer unit having a three phase secondary winding,
   a three phase bridge rectifier having six legs with a rectifying element in each leg and being connected to the secondary winding to provide full wave rectification of the output, one of said rectifying elements being controllable by application of a firing signal during a selected half cycle of the related phase input voltage and all other of said rectifying elements conducting during one complete half cycle of the input voltage, and
   a switching and comparator unit including an output means to control said controllable rectifying element and having a first input and a second input said first input being connected to the output of said bridge rectifier, and said second input being connected to the secondary winding, the connection to the secondary winding corresponding in phase to the phase leg of the bridge rectifier including the controllable rectifying element.

8. A three phase regulated static power supply for supplying rectified power from an alternating current source, comprising
   a three phase transformer unit having a Y connected secondary winding,
   a three phase bridge rectifier having six legs with a rectifying element in each leg and connected to the secondary winding to provide full wave rectification of the output, one of said rectifying elements being a gate controlled rectifier having a firing terminal and controllable by application of a firing signal to the firing terminal during a selected half cycle of the related phase input voltage and all other of said rectifying elements being diodes, and
   a switching and comparator unit including an output means connected to said firing terminal and having a first input and a second input, said first input being connected to the output of said bridge rectifier, and said second input being connected to the secondary winding, the connection to the secondary winding corresponding in phase to the phase leg of the bridge rectifier including the gate controlled rectifier.

9. A three phase regulated static power supply for supplying rectified power from an alternating current source, comprising
   a three phase transformer unit having a Y connected secondary winding,
   a three phase bridge rectifier connected to the secondary winding and having a plurality of silicon rectifying units interconnected into three rectifying branches for full wave rectification of the secondary output, one of said rectifying units including a silicon controlled rectifier having a firing input terminal and the other of said rectifying units consisting of silicon diodes whereby only one leg is controllable,
   a magnetic gate switching unit having a magnetic core with a pulse winding connected to the firing input terminal and a feedback winding wound thereon, said core having an essentially rectangular hysteresis characteristic, and
   a feedback circuit connecting the output side of the bridge rectifier and to the feedback winding.

10. A three phase regulated static power supply for supplying rectified power from an alternating current source, comprising
    a three phase transformer unit having a Y connected secondary winding with each phase winding being tapped to provide a plurality of output connections,
    a three phase bridge rectifier connected to the secondary winding and having a plurality of silicon rectifying units interconnected into three rectifying branches for full wave rectification of the secondary output, one of said rectifying units comprising a silicon controlled rectifier having a firing input terminal and the other of said rectifying units comprising silicon diodes whereby only one rectifying branch is controllable,
    a magnetic gate switching unit having a magnetic core with a pulse output winding, an input winding, a reference winding and a feedback winding wound thereon, said core having an essentially rectangular hysteresis characteristic,
    means connecting the input winding to the secondary phase winding connected to the rectifier branch including said silicon controlled rectifier,
    a feedback circuit connecting the output side of the bridge rectifier to the feedback winding, and
    a direct current reference circuit connecting the transformer secondary winding to the reference winding and including means to preset the energization thereof.

11. A three phase regulated static power supply for supplying rectified power from an alternating current source, comprising
- a three phase transformer unit having a Y connected secondary winding with each phase winding being tapped to provide a plurality of output connections,
- a three phase bridge rectifier connected to the secondary and having a plurality of silicon rectifying units interconnected into three rectifying branches for full wave rectification of the secondary output and having direct current output lines, one of said rectifying units comprising a silicon controlled rectifier having a firing input terminal and the other of said rectifying units comprising silicon diodes whereby only one rectifying branch is controllable,
- a magnetic gate switching unit having a magnetic core with a pulse winding, an input winding, a reference winding and a feedback winding wound thereon, said core having an essentially rectangular hysteresis characteristic,
- means connecting the input winding to the secondary phase winding connected to the rectifier branch including said silicon controlled rectifier,
- a feedback circuit including a resistor connected in series with an inductor across the output lines and means connecting the feedback winding across said resistor, and
- a reference circuit including a regulated direct current source connected to transformer secondary and a current adjusting means connecting the output of the regulated direct current source across the reference winding.

References Cited

UNITED STATES PATENTS

| | | | |
|---|---|---|---|
| 1,430,987 | 10/1922 | Hanff | 323—91 X |
| 3,114,098 | 12/1963 | Rallo et al. | 321—18 |
| 3,258,675 | 6/1966 | Logan | 321—16 X |
| 3,273,043 | 9/1966 | Clark et al. | 321—18 |
| 3,281,641 | 10/1966 | Hodgeson | 321—8 |

JOHN F. COUCH, *Primary Examiner.*

W. M. SHOOP, JR., *Assistant Examiner.*